United States Patent
Duffell et al.

(10) Patent No.: US 9,603,178 B2
(45) Date of Patent: Mar. 21, 2017

(54) SECURE PAIRING OF PERSONAL DEVICE WITH HOST DEVICE

(71) Applicant: INTERNATIONAL BUSINESS MACHINES CORPORATION, Armonk, NY (US)

(72) Inventors: John W. Duffell, London (GB); Alexander R. Melkonian, Hursley (GB); Joe Pavitt, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/921,107

(22) Filed: Oct. 23, 2015

(65) Prior Publication Data

US 2016/0128118 A1 May 5, 2016

(30) Foreign Application Priority Data

Oct. 29, 2014 (GB) .................................. 1419253.8

(51) Int. Cl.
*H04B 7/00* (2006.01)
*H04W 76/02* (2009.01)
(Continued)

(52) U.S. Cl.
CPC ......... *H04W 76/023* (2013.01); *H04W 4/008* (2013.01); *H04W 12/04* (2013.01); *H04W 12/06* (2013.01)

(58) Field of Classification Search
CPC ..... H04W 12/04; H04W 12/06; H04W 12/08; H04W 76/023; G06T 19/006
(Continued)

(56) References Cited

U.S. PATENT DOCUMENTS

| 8,438,110 B2 | 5/2013 | Calman et al. |
| 2013/0016070 A1 | 1/2013 | Starner et al. |

(Continued)

FOREIGN PATENT DOCUMENTS

| CN | 102866506 A | 1/2013 |
| CN | 104010268 A | 8/2014 |
| WO | 02056536 A1 | 7/2002 |

OTHER PUBLICATIONS

Roesner et al., "Security and Privacy for Augmented Reality Systems", Apr. 2013, pp. 1-10.
(Continued)

*Primary Examiner* — Lee Nguyen
(74) *Attorney, Agent, or Firm* — Richard Wilheim; Matthew M. Hulihan; Heslin Rothenberg Farley & Mesiti PC

(57) ABSTRACT

Pairing one or more personal devices to a host device is provided. An example method includes detecting one or more personal devices in wireless proximity communication range of a host device; allocating and storing a respective unique input instruction for each personal device in range, wherein a unique input instruction is convertible to an augmented reality display input at a personal device; transmitting the unique input instruction to the personal device; providing an input interface of the host device; receiving, from a user of the personal device, user input at the input interface of the host device; and activating an exclusive pairing between the host device and the personal device for which the user input has been received.

20 Claims, 10 Drawing Sheets

(51) Int. Cl.
*H04W 12/04* (2009.01)
*H04W 4/00* (2009.01)
*H04W 12/06* (2009.01)
*H04B 1/00* (2006.01)

(58) Field of Classification Search
USPC .............................. 455/41.2–41.3, 410–411
See application file for complete search history.

(56) References Cited

U.S. PATENT DOCUMENTS

2013/0288647 A1   10/2013   Turgeman
2013/0346168 A1   12/2013   Zhou et al.
2016/0128118 A1*   5/2016   Duffell .................. H04W 12/04
                                                             455/41.2

OTHER PUBLICATIONS

Yan et al., "Designing Leakage-Resilient Password Entry on Touchscreen Mobile Devices", Asia CCS' 13, May 8-10, 2013, pp. 1-12.

* cited by examiner

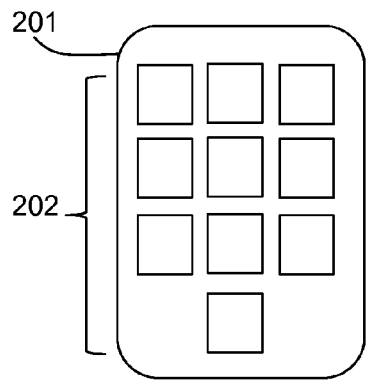
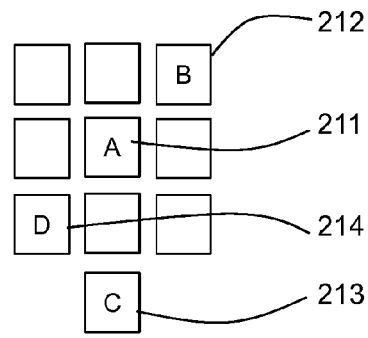
FIG. 2A
FIG. 2B
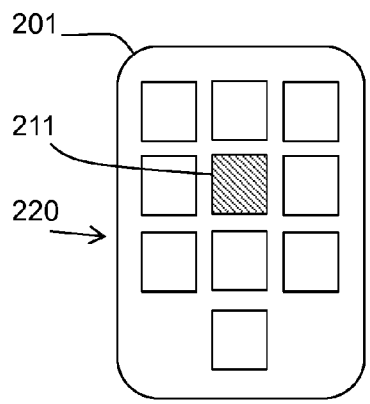
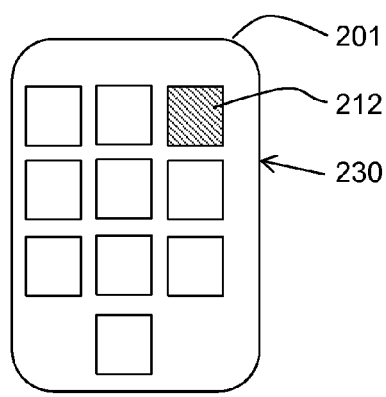
FIG. 2C
FIG. 2D
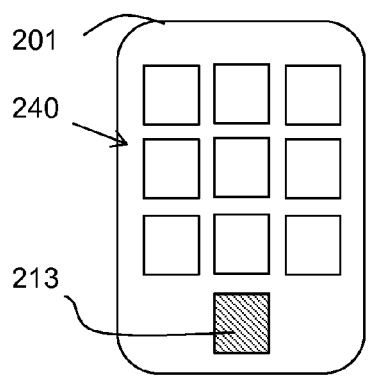
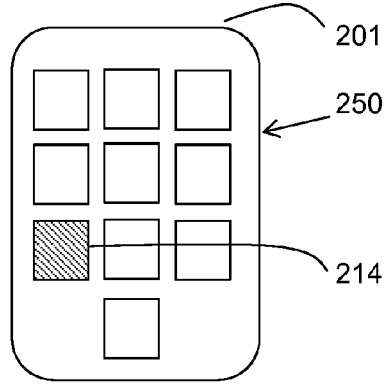
FIG. 2E
FIG. 2F

SECURE PAIRING OF PERSONAL DEVICE WITH HOST DEVICE

PRIOR FOREIGN APPLICATION

This application is based on and claims the benefit of priority from United Kingdom Application 1419253.8, filed on Oct. 29, 2014, which is hereby incorporated herein by reference in its entirety.

BACKGROUND

Aspects described herein relate to the field of pairing devices in proximity to each other. In particular, aspects described herein relate to secure pairing of a personal device with a host device.

Pairing is a common practice in wireless devices. As time goes on, more devices are going to be network connected (Internet of Things) and the need to address problems associated with pairing of devices will be greater.

Wearable devices in the form of headsets, for example, Google Glass (Google and Google Glass are trademarks of Google, Inc., Mountain View Calif., U.S.A.) are known, which enable an augmented reality (AR) display. Mobile phone devices with a camera may also be used as an augmented reality device by overlaying an augmented reality display on the screen of the mobile phone device.

In AR personal identification number (PIN) code security, a PIN entry device is paired with the AR-capable device. This may use a traditional pairing by exchanging some information or holding down a button (as examples), however this can be cumbersome for the user.

Current solutions for pairing involve making one device discoverable, selecting that device on the other device, and then checking that the confirmation codes match to make sure there is not someone else trying to interfere with the pairing. This can provide adequate security if users check the codes carefully. In practice, the inconvenience of checking the codes prevents people from checking and reduces the security. This can be a problem in situations where there could be big rewards for attackers, for instance in a financial situation.

SUMMARY

Aspects described herein address the aforementioned problems. Improved methods of secure pairing is provided in situations where a user input is received, for instance for cash points and chip and pin devices, where high security is desired.

Shortcomings of the prior art are overcome and additional advantages are provided through the provision of a computer-implemented method that includes: detecting one or more personal devices in wireless proximity communication range of a host device; allocating and storing a respective unique input instruction for each personal device in range, wherein a unique input instruction is convertible to an augmented reality display input at a personal device; transmitting the unique input instruction to the personal device; providing an input interface of the host device; receiving, from a user of the personal device, user input at the input interface of the host device; and activating an exclusive pairing between the host device and the personal device for which the user input has been received.

Further, a data processing system is provided that includes a memory; and a processor in communications with the memory. The data processing system is configured to perform a method that includes: detecting one or more personal devices in wireless proximity communication range of a host device; allocating and storing a respective unique input instruction for each personal device in range, wherein a unique input instruction is convertible to an augmented reality display input at a personal device; transmitting the unique input instruction to the personal device; providing an input interface of the host device; receiving, from a user of the personal device, user input at the input interface of the host device; and activating an exclusive pairing between the host device and the personal device for which the user input has been received.

Yet further, a computer program product is provided, that includes a computer readable storage medium readable by a processor and storing instructions for execution by the processor for performing a method that includes: detecting one or more personal devices in wireless proximity communication range of a host device; allocating and storing a respective unique input instruction for each personal device in range, wherein a unique input instruction is convertible to an augmented reality display input at a personal device; transmitting the unique input instruction to the personal device; providing an input interface of the host device; receiving, from a user of the personal device, user input at the input interface of the host device; and activating an exclusive pairing between the host device and the personal device for which the user input has been received.

Additional features and advantages are realized through the concepts of the present invention. Other embodiments and aspects of the invention are described in detail herein and are considered a part of the claimed invention.

BRIEF DESCRIPTION OF THE DRAWINGS

The subject matter is particularly pointed out and distinctly claimed in the concluding portion of the specification. Embodiments of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which:

FIGS. 2A to 2F are schematic diagrams of example pairing input views, in accordance with an example embodiment of the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of aspects of the invention. However, it will be understood by those skilled in the art that aspects of the present invention may be practiced without these specific details. In other instances, well-known methods, procedures, and components have not been described in detail so as not to obscure the aspects of the present invention.

Provided are methods and systems of secure pairing of a personal device in the form of a visible wireless device with a host device in the form of a base station showing a blank grid or input screen on its input screen or interface. The personal device has an AR capability to provide an augmented view of the blank grid or input screen of the host device. The personal device may be a wearable device with augmented reality or a handheld device with a camera providing an overlay AR display. AR capability provides a live direct view of a physical, real-world environment whose elements are augmented (or supplemented) by computer-generated sensory input such as sound, video, and graphics.

Personal devices having proximity wireless connection capabilities within range of the host device may do a handshake with the host device and agree on a distinct input to be the pair input. This distinct input may take various different forms. For example, the input may be the pressing of a button which is highlighted on the AR capability of the personal device which corresponds to a blank grid on the host device. In another example, the input may be a gesture which is shown on the AR capability of the personal device with a blank input screen of the host device. The input capability and input instructions may take other different forms as long as they can be visually represented on an overlay. Examples include swipes, gestures, touching specific areas of a picture or video, tapping a rhythm or the rhythm of a person's typing.

When the input is provided, the pairing is completed and the host device knows it can trust that the person physically at the input screen of the host device as the only person who can see the transmits display.

Figure 1:
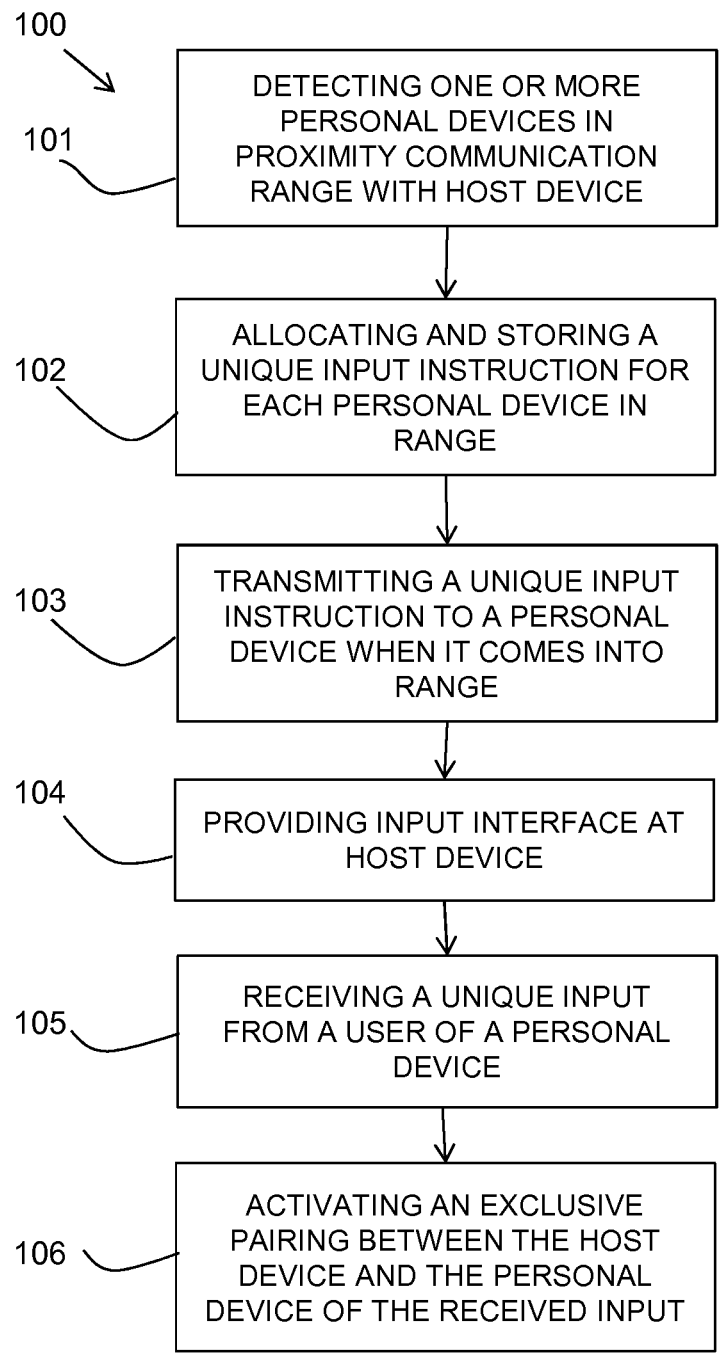
FIG. 1 is a flow diagram of an example embodiment of a method, in accordance with aspects described herein.

Referring to FIG. 1, a flow diagram 100 shows an example embodiment of a method as carried out at a host device, in accordance with aspects described herein.

One or more personal devices having proximity communication with the host device are detected 101 as they come into range of the host device. For example, the proximity communication may be Bluetooth communication or other forms of communication which allow short distance data exchange such as via a WiFi communication, peer network, or near field communication (NFC).

The host device allocates and stores 102 a unique input instruction for each personal device in range. As personal devices come in and out of range of the host device, the unique input instructions may be allocated and deallocated and the store of the allocations updated. The personal devices are stored with reference to their IDs which are picked up by the host device as they come into range.

A unique input instruction is transmitted 103 to a personal device when it comes into range of the host device.

The host device maintains a separate communications channel for each personal device in range and transmits and stores unique input instructions for each active device. A Diffie Hellman key exchange may be used as the basis for the multiple separate, secure communications channels between the host device and the personal devices.

Camera or screen enabled personal devices may determine the location of the terminal and overlay their unique input instructions onto the input interface using a standard QR code or other pattern or marker to detect the exact location or origin of the input device. The pattern or marker may be a uniquely identifiable symbol from any angle such that the virtual overlay is positioned such that they correlate to the correct location on the physical input interface.

The host device may provide 104 an input interface in the form of an input screen for manual input of the input instruction by a user of a personal device. The input screen may have a touch sensitive input interface. In one embodiment, the host device may have a plain touch sensitive input interface with no numbers, letters or buttons on it. Instead, the information for the buttons may be overlaid onto the input interface with AR such that no other external parties can see what the unique input is.

The host device may receive 105 a unique input physically at the host device corresponding to a personal device and may look up the store of unique input instructions to determine the ID of the personal device.

The host device may activate 106 an exclusive pairing between the host device and the personal device for which the unique input has been received.

A separate communications channel may be maintained for each personal device in range with the host device. Each personal device within range carries out a handshake with the host device based on their own unique input instruction. Each personal device has its unique and secure channel over which the unique input instruction is sent. Once one of the users inputs the user's instruction, all other communication channels may be closed. Once the exclusive user has finished the user's session, the host device may rescan and the multiple connections may be re-established with relevant personal devices in range of the host device.

Unique input instructions for each device are transmitted to the relevant device such that the user of the personal device is the only person to view a particular set of unique input instructions.

Using the personal device having AR capability, the unique input instructions are overlaid over the input interface of the host device. The instruction is mapped to the input interface. In one embodiment, a marker may be provided as an "origin". For example, the input instruction could be "swipe along this line" with the user being displayed a line of the touch sensitive interface.

A user inputs the instruction that is unique for the user's personal device. In response to successful input, pairing with the base station is complete and secure handshakes with all other nearby devices may be terminated, such that only one channel is in existence once the pairing has taken place.

Referring to FIGS. 2A to 2F, schematic diagrams show example pairing input views in accordance with an embodiment of example methods and systems described herein. FIG. 2A shows a blank grid 202 of an input interface 201 in the form of a keypad of a host device as viewable without any AR. This is what a casual viewer of the host device may see.

FIG. 2B shows the assignment of each key in the keypad to a single personal device in proximity communication range of the host device. In this example, there are four personal devices in range A, B, C, D. Personal device A has been allocated key 211, personal device B has been allocated key 212, personal device C has been allocated key 213, and personal device D has been allocated key 214. This view is not seen by a user but illustrates the allocation of the keys as stored by the host device.

FIG. 2C shows a view 220 of the input interface 201 as seen by a user of personal device A showing an AR overlay instructing input using key 211.

FIG. 2D shows a view 230 of the input interface 201 as seen by a user of personal device B showing an AR overlay instructing input using key 212.

FIG. 2E shows a view 240 of the input interface 201 as seen by a user of personal device C showing an AR overlay instructing input using key 213.

FIG. 2F shows a view 250 of the input interface 201 as seen by a user of personal device D showing an AR overlay instructing input using key 214.

Figure 3A:
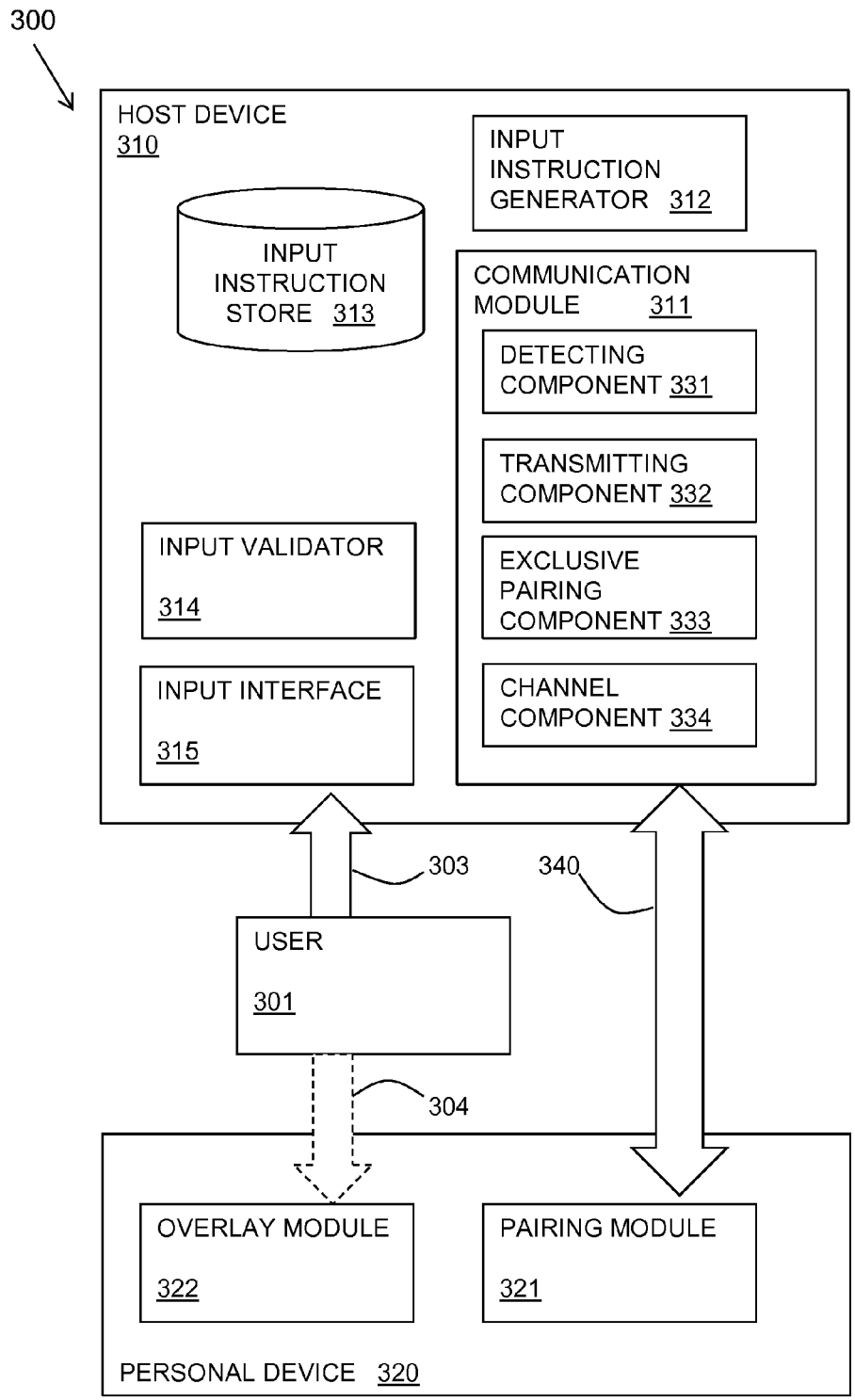
FIG. 3A is block diagram of an example embodiment of a system, in accordance with aspects described herein.

Referring to FIG. 3A, a block diagram shows an example embodiment of the described system 300. A host device 310 is provided which may be a base station to which one or more personal devices 320 wish to be securely paired via a wireless proximity communication 340. The host device 310 may be a personal device itself, for example in the form of a personal mobile phone to which another user may wish to have an exclusive connection.

The host device 310 has a communication module 311 for connection to one or more personal devices 320 via the wireless proximity communication 340 within a range of the proximity communication.

The host device 310 includes an input instruction generator 312 for generating unique input instructions for each connecting personal device 320. An input instruction may be reused and re-allocated when a personal device exits the range of the proximity communication and the input instruction generator 312 may include such allocation functionality. An input instruction store 313 may store allocated input instructions against personal device identifier(s). The personal device identifier(s) may be obtained by the communication module 311 when a personal device 320 comes into range of the host device 310.

The host device 310 may include an input interface 315, which may be in the form of a touch sensitive screen. The input interface 315 may be integrated into the host device 310 or may be a separate interface which may be provided separately, for example, in the form of a point-of-sale device with remote handset. An input validator 314 may reference a received input against input instructions stored in the input instruction store 313.

The communication module 311 of the host device 310 may include a detecting component 331 for detecting personal devices 320 in range of the proximity communication of the host device 310. The communication module 311 may also include a transmitting component 332 for transmitting to a personal device 320 including transmitting unique input instructions for the personal device 320. The communication module 311 may also include an exclusive pairing component 333 for maintaining an exclusive pairing for a personal device 320 the user of which has entered an input corresponding to the personal device's unique input instruction into the input interface 315 of the host device 310. The communication module 311 may also include a channel component 334 for maintaining separate communication channels with personal devices 320 in range of the host device 310.

A personal device 320 may, for example, be in the form of a mobile phone, wearable device, tablet, or other form of handheld or portable device having proximity communication capabilities.

The personal device 320 may include a pairing module 321 for pairing to a host device 310 using the proximity communication and an overlay module 322 for providing AR capability. The overlay module 322 may interact with an AR system of the personal device, for example when the personal device is in the form of a wearable device. The overlay module 322 may alternatively interact with, as an example, a camera to provide an AR overlay to a camera sight when the personal device is in the form of a portable handheld device.

A user 301 of the personal device 320 may view 304 an input instruction provided by the overlay module 322 and may physically input 303 the input into the input interface 315 of the host device 310.

Figure 3B:
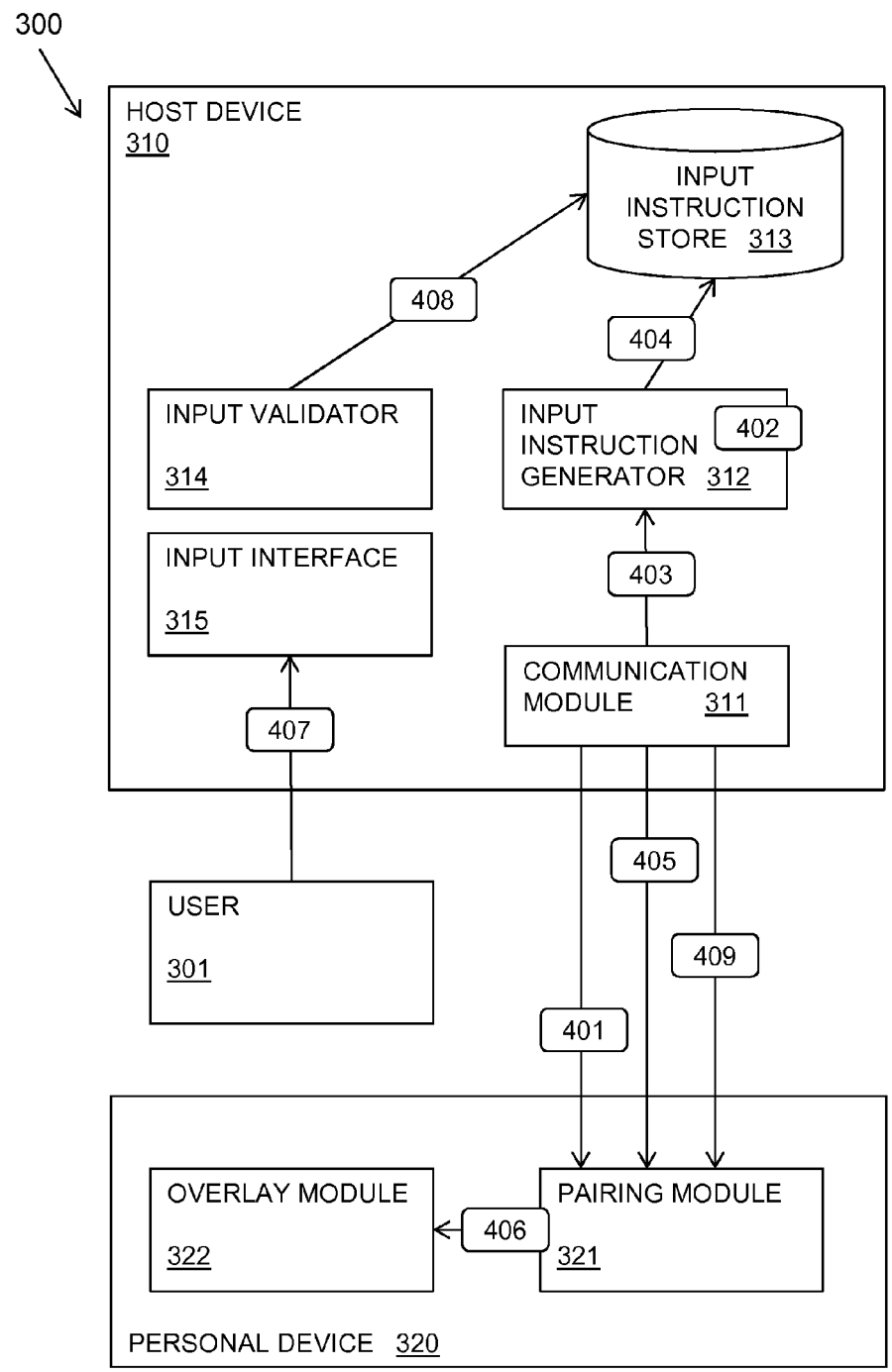
FIG. 3B is a block diagram of FIG. 3A showing a method flow superimposed on the system, in accordance with aspects described herein.

Referring to FIG. 3B, the system 300 of FIG. 3A is shown with an example method superimposed. The example method is described in relation to FIG. 4.

Figure 4:
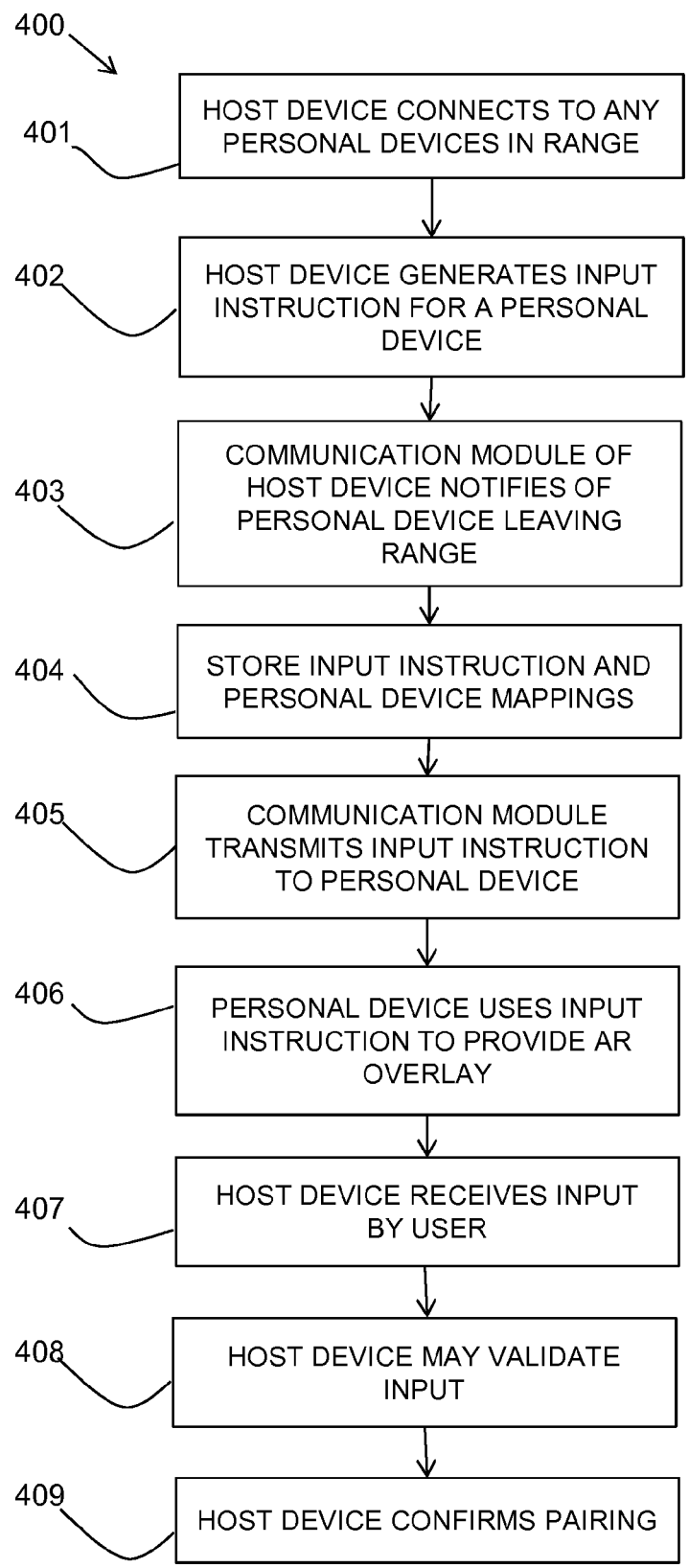
FIG. 4 is a flow diagram of an example embodiment of a method, in accordance with aspects described herein.

FIG. 4 is a flow diagram showing an example pairing method 400 of the system 300 of FIG. 3A, with a method flow between a host device 310 and a personal device 320 shown and described.

Initially, the host device 310 may be started by an external signal and may enable an input interface 315.

A communication module 311 of the host device 310 may connect 401 with any personal devices 320 in range of the communication module 311. The input instruction generator 312 of the host device 310 may generate 402 a unique input instruction for each new personal device 320 that comes into range of the host device 310. The input instruction generator 312 may generate 402 a unique input instruction by re-allocating a unique input instruction from a personal device 320 that has left the range of the host device 310, as one example.

The communication module 311 may notify 403 the input instruction generator 312 of remove requests for personal devices 320 leaving the range.

The input instruction generator 312 informs 404 an input instruction store 313 of personal device to unique input instruction mappings which are stored in the input instruction store 313 using an identifier of the personal device 320 as obtained by the communication module 311.

The communication module 311 transmits 405 the unique input instruction to the personal device's pairing module 321. A personal device 320 may use 406 the input instruction to provide an AR overlay or display by an overlay module 322.

The user 301 may use his personal device 320 to look at the input interface 315 of the host device 310. The overlay module 322 may provide guidelines to position the AR input instructions in relation to the input interface 315. The user 301 may apply the proper input at the input interface 315 and this may be received 407 by the input interface 315.

An input validator 314 at the host device 310 may check 408 if the input received matches the stored input instruction at the input instruction store 313 and sends the personal device identifier to the communication module 311. The communication module 311 confirms 409 the pairing with the personal device 320 and may discards other connections.

Figure 5:
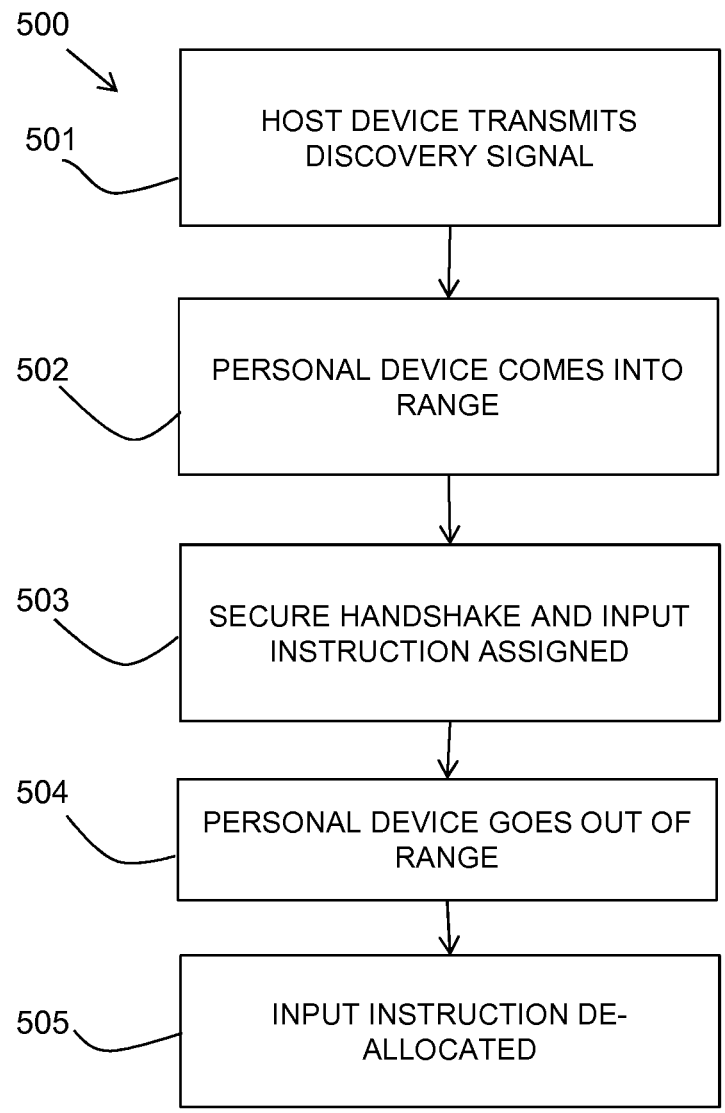
FIG. 5 is a flow diagram of an example embodiment of a method, in accordance with aspects described herein.

Referring to FIG. 5, a flow diagram 500 shows an example embodiment of a method at the host device.

A host device may transmit 501 a discovery signal so that personal devices in range can pick up the discovery signal. A personal device may come into range 502 of a host device. The personal device may also transmit a discovery signal so that the host device can pick it up. The discovery signal of the personal device may include a personal device identifier.

A secure handshake is carried out 503 between the host device and the personal device and input instructions assigned to the personal device. When the personal device goes out of range 504 the input instructions are de-allocated 505.

In this way, personal devices in range at any given time may have allocated input instructions. However, a single personal device can have an active session with the host device at any given time and this may be determined by the input received at the host device input interface.

Figure 6:
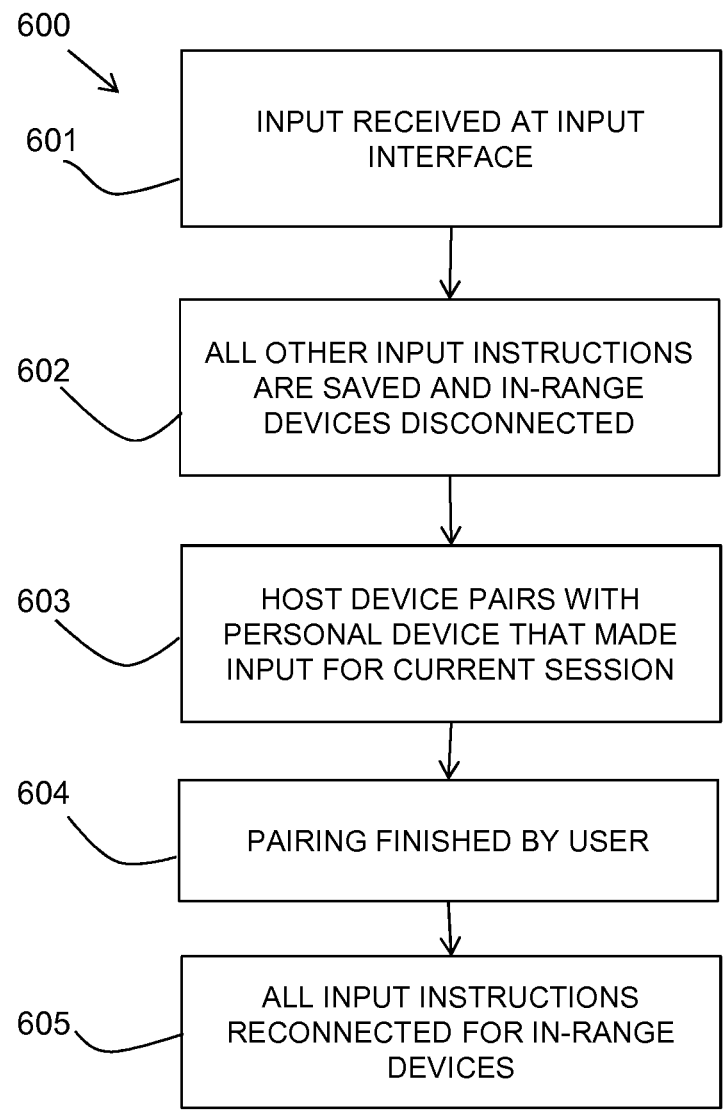
FIG. 6 is a flow diagram of an example embodiment of a method, in accordance with aspects described herein.

FIG. 6 is a flow diagram 600 of an example embodiment of a method at the host device.

An input is received 601 at the input interface of a host device as input by the user of a personal device. All other input instructions may be saved and the other in-range personal devices may be disconnected 602.

The host device pairs 603 for an exclusive (in some embodiments) session with the personal device associated with the input received. During an exclusive session, in some embodiments, there may be no possibility of any other users intercepting or interfering with the user or the host device since it is limited to only one of these connections at a time.

The exclusive session may be finished 604 by the user of the personal device or by the host device. All input instructions may be reconnected 605 for in-range devices.

Figure 7:
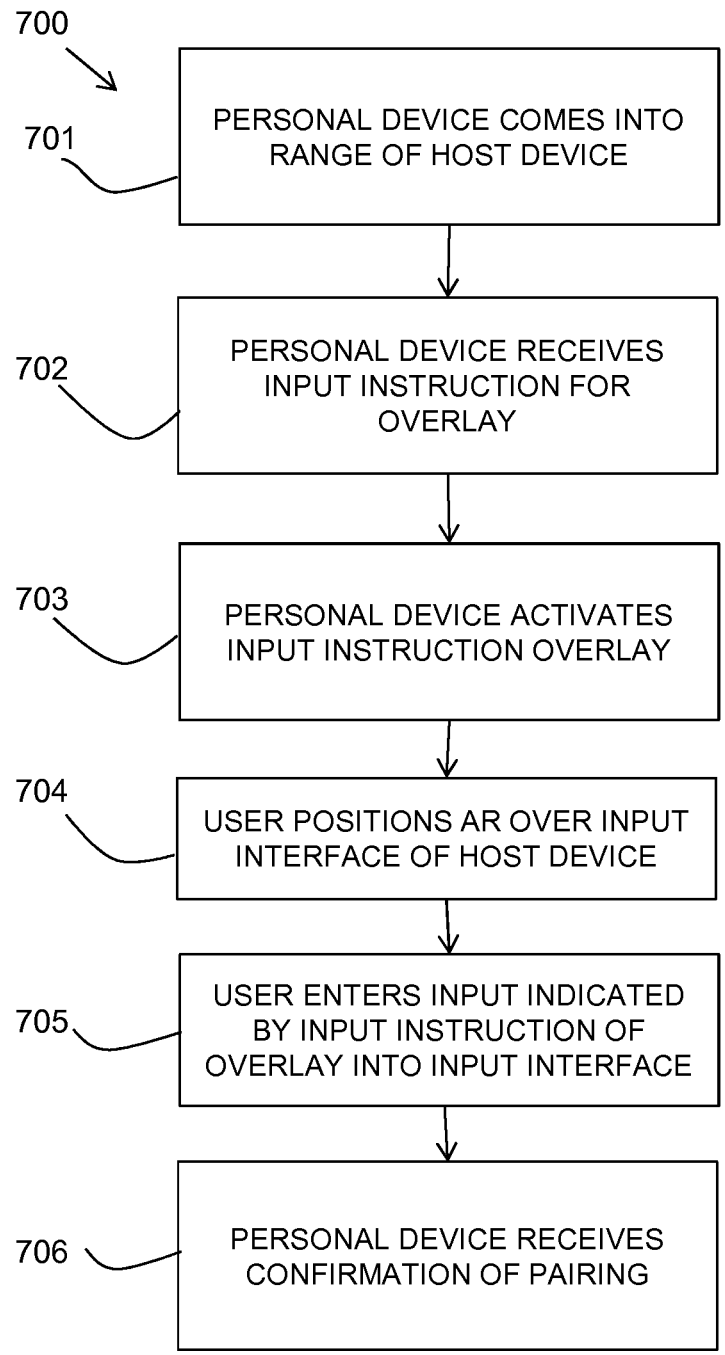
FIG. 7 is a flow diagram of an example embodiment of a method, in accordance with aspects described herein.

Referring to FIG. 7, a flow diagram 700 shows an example embodiment of a method at the personal device.

A personal device may come into range 701 of the host device. The personal device may receive 702 input instructions for an overlay. The personal device may activate 703 the input instruction overlay.

A user of the personal device may position 704 the AR overlay over the input interface of the host device. The user enters 705 the input indicated by the input instruction of the overlay into the input interface of the host device. The personal device may receive 706 confirmation of pairing with the host device.

Figure 8:
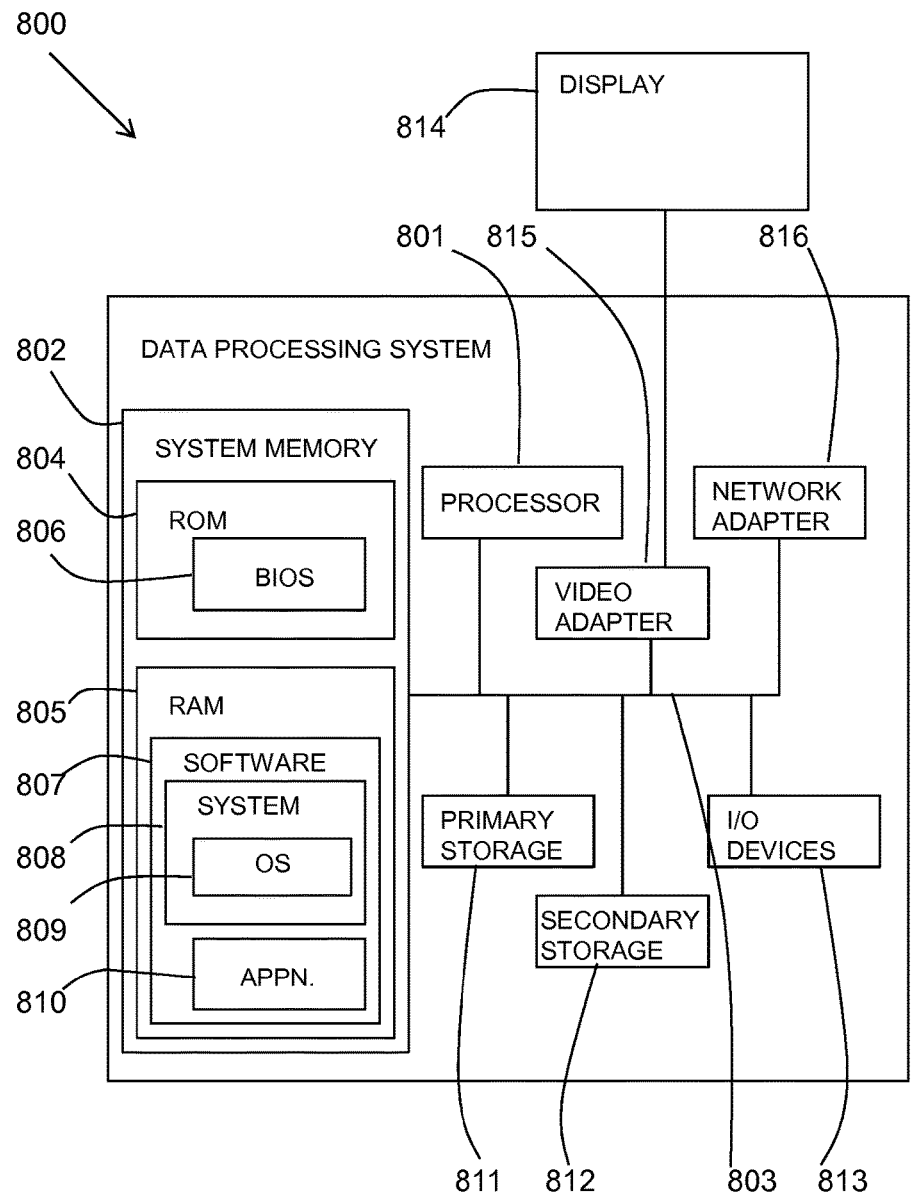
FIG. 8 is a block diagram of an embodiment of a system to implement aspects described herein.

Referring to FIG. 8, an embodiment of a system to implement aspects described herein, such as the host device, includes a data processing system 800 suitable for storing and/or executing program code including at least one processor 801 coupled directly or indirectly to memory elements through a bus system 803. The memory elements may include local memory employed during actual execution of the program code, bulk storage, and cache memories which provide temporary storage of at least some program code in order to reduce the number of times code is retrieved from bulk storage during execution.

The memory elements may include system memory 802 in the form of read only memory (ROM) 804 and random access memory (RAM) 805. A basic input/output system (BIOS) 806 may be stored in ROM 804. Software 807 may be stored in RAM 805 including system software 808 such as operating system software 809. Software applications 810 may also be stored in RAM 805.

The system 800 may also include a primary storage 811 such as a magnetic hard disk drive and secondary storage 812 such as a magnetic disc drive and an optical disc drive. The drives and their associated computer-readable media provide non-volatile storage of computer-executable instructions, data structures, program modules and other data for the system 800. Software applications may be stored on the primary and secondary storage means 811, 812 as well as the system memory 802.

The computing system 800 may operate in a networked environment using logical connections to one or more remote computers via a network adapter 816.

Input/output devices 813 may be coupled to the system either directly or through intervening I/O controllers. A user may enter commands and information into the system 800 through input devices such as a keyboard, pointing device, or other input devices (for example, microphone, joy stick, game pad, satellite dish, scanner, or the like). Output devices may include speakers, printers, etc. A display device 814 is also connected to system bus 803 via an interface, such as video adapter 815.

Figure 9:
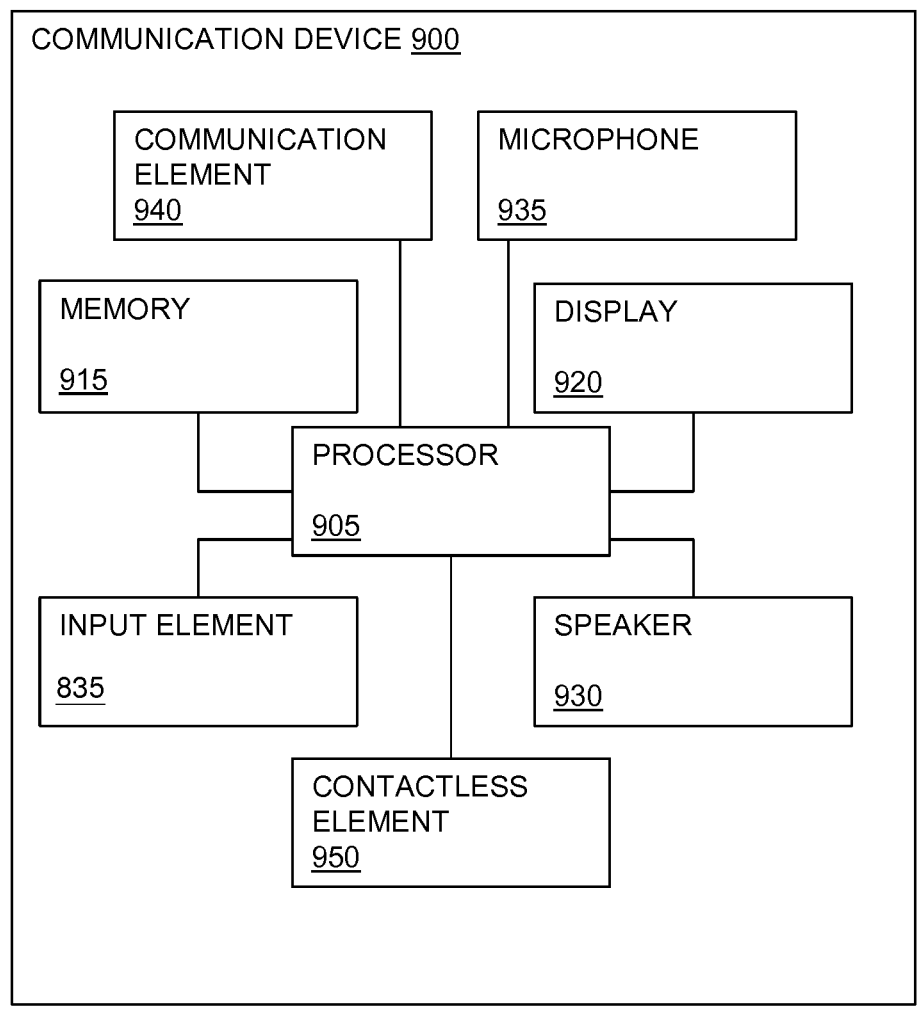
FIG. 9 is a block diagram of an embodiment of a communication device in which aspects described herein may be implemented.

FIG. 9 shows a block diagram of an example communication device 900, that may be used in embodiments of the disclosure, for example as a personal device and/or a host device. The communication device 900 may be a cell phone, a feature phone, a smart phone, a satellite phone, or a computing device having a phone capability, including a wearable device such as glasses, watches, etc.

The communication device 900 may include a processor 905 (e.g., a microprocessor) for processing the functions of the communication device 900 and a display 920 to allow a user to see the phone numbers and other information and messages. The communication device 900 may further include an input element 925 to allow a user to input information into the device (e.g., input buttons, touch screen, etc.), a speaker 930 to allow the user to hear voice communication, music, etc., and a microphone 935 to allow the user to transmit his or her voice through the communication device 900.

The processor 910 of the communication device 900 may connect to a memory 915. The memory 915 may be in the form of a computer-readable medium that stores data and, optionally, computer-executable instructions.

The communication device 900 may also include a communication element 940 for connection to communication channels (e.g., a cellular telephone network, data transmission network, Wi-Fi network, satellite-phone network, Internet network, Satellite Internet Network, etc.). The communication element 940 may include an associated wireless transfer element, such as an antenna.

The communication element 940 may include a subscriber identity module (SIM) in the form of an integrated circuit that stores an international mobile subscriber identity and the related key used to identify and authenticate a subscriber using the communication device 900. One or more subscriber identity modules may be removable from the communication device 900 or embedded in the communication device 900.

The communication device 900 may further include a contactless element 950, which is typically implemented in the form of a semiconductor chip (or other data storage element) with an associated wireless transfer element, such as an antenna. The contactless element 950 may be associated with (e.g., embedded within) the communication device 900 and data or control instructions transmitted via a cellular network may be applied to the contactless element 950 by means of a contactless element interface (not shown). The contactless element interface may function to permit the exchange of data and/or control instructions between mobile device circuitry (and hence the cellular network) and the contactless element 950.

The contactless element 950 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device 900 and an interrogation device. Thus, the communication device 900 may be capable of communicating and transferring data and/or control instructions via both a cellular network and near field communications capability.

The data stored in the memory 915 may include: operation data relating to the operation of the communication device 900, personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device 900 to selected receivers.

The communication device 900 may be, amongst other things, a notification device that can receive alert messages and access reports, a portable merchant device that can be used to transmit control data identifying a discount to be applied, as well as a portable consumer device that can be used to make payments.

Example methods and systems provide convenience and less friction for the user. In embodiments, the user does not have to provide or wield a touchscreen or cursor mechanism personal to them; the shared input device can be mounted in a convenient place. This provides benefits for mobility impaired people, as well as speeding up the process, which may be valuable in high-throughput areas such as ticket machines/ticket barriers and ATMs. It may also be more intuitive for young or inexperienced users. Example methods also have benefits for wearable devices such AR glasses where direct input to the glasses is difficult.

Example methods and systems may also provide protection. With the system, the user is physically at the device to pair. This means users in range may have the ability to pair, but a user physically there may have priority by the user's physical presence. Once the user has paired, the pairing is confirmed until the user either completes the interaction or cancels (as examples). In some existing systems, another user in the area may have caused a denial of service by either intervening and pairing with the device from a distance, or "stealing" the pairing after the legitimate user has paired. For example systems described herein, a person would have to physically intervene to use the input device, which would be obvious to others, especially the first user who was in the process of pairing. Although this would not necessarily cause any loss of information if there was a following authentication step, it would be inconvenient and amount to a denial of service attack.

Example methods and systems enable prevention of unsolicited connections. To pair, for example, with a user's phone, someone would have to physically press something on it. Just seeing it would not be enough. This would prevent bluejacking style attacks if a phone is left visible in a public place. The person would have to physically interact with the phone to pair with it.

According to aspects described herein, a method is provided of pairing one or more personal devices to a host device, wherein the method is carried out at a host device, the method including: detecting one or more personal devices in wireless proximity communication range of the host device; allocating and storing a unique input instruction for each personal device in range, wherein the unique input instruction is convertible to an augmented reality display input at a personal device; transmitting a unique input instruction to a personal device; providing an input interface of the host device; receiving a unique input from a user of a personal device at an input interface of the host device; and activating an exclusive pairing between the host device and the personal device for which the unique input has been received.

The host device may maintain a separate communication channel for each personal device in range. Maintaining a separate communication channel for each personal device in range may include carrying out a secure handshake exchanging encryption keys.

The method may include deallocating and updating the storage of a unique input instruction for a personal device which exits the range of the host device.

The method may further include: detecting a discovery signal of a personal device in range of the host device, wherein the discovery signal includes an identifier of the personal device; and referencing the storage of a unique input instruction for a personal device with the identifier of the personal device.

The method may also include: after receiving a unique input at the input interface, validating the input by comparing to the stored input instruction for a personal device; sending a confirmation with the personal device identified in the storage; and discarding all other separate communication channel connections to other personal devices in range.

The method may include: receiving notification of the end of an exclusive pairing with a personal device; and re-establishing the separate communication channel connections with the other personal devices in range.

Transmitting a unique input instruction to a personal device may include transmitting a location and guidance to facilitate input of the input instruction in an input interface of the host device. Transmitting a location and guidance may include providing a Quick Response code or other marker providing the information.

According to aspects described herein, a system is provided for pairing one or more personal devices to a host device, comprising a host device including: a communication module for communication with one or more personal devices using wireless proximity communication; the communication module including a detecting component for detecting one or more personal devices in wireless proximity communication range of the host device; an input instruction generator for allocating and storing in an input instruction store a unique input instruction for each personal device in range; the communication module including a transmitting component for transmitting a unique input instruction to a personal device; an input interface of the host device for receiving a physical user input from a user of a personal device; an input validator for receiving a unique input; and the communication module including an exclusive pairing component for activating an exclusive pairing between the host device and the personal device for which the unique input has been received.

The communication module may include a channel component for maintaining a separate communication channel for each personal device in range. The channel component for maintaining a separate communication channel for each personal device in range may include carrying out a secure handshake exchanging encryption keys.

The system may include deallocating and updating the input instruction store for a unique input instruction for a personal device which exits the range of the host device.

The detecting component may be for detecting a discovery signal of a personal device in range of the host device, wherein the discovery signal includes an identifier of the personal device; and the input instruction store references the storage of a unique input instruction for a personal device with the identifier of the personal device.

The system may include: an input validator for, after receiving a unique input at the input interface, validating the input by comparing to the stored input instruction for a personal device; the transmitting component sending a confirmation with the personal device identified in the storage; and the channel component discarding all other connections to other personal devices in range.

The system may further include: the detecting component receiving notification of the end of an exclusive pairing with a personal device; and the channel component reconnecting the other personal devices in range.

The transmitting component for transmitting a unique input instruction to a personal device may include transmitting a location and guidance to facilitate input of the input instruction in an input interface of the host device. Transmitting a location and guidance may include providing a Quick Response code or other marker providing the information.

According to additional aspects described herein, there is provided a computer program stored on a computer readable medium and loadable into the internal memory of a digital computer, comprising software code portions, when said program is run on a computer, for performing method(s) described herein.

According to further aspects described herein, a method is provided of pairing one or more personal devices to a host device, wherein the method is carried out at a personal device, the method comprising: detecting a host device in wireless proximity communication range of the personal device; receiving a unique input instruction for the personal device; converting the input instruction to an augmented reality display input at the personal device; applying the augmented reality display at an input interface of the host device to enable a user of the personal device to input the input instruction at the input interface; and receiving confirmation of an exclusive pairing between the host device and the personal device.

According to further aspects described herein, a system is provided for pairing one or more personal devices to a host device, comprising a personal device including: a pairing module for detecting a host device in wireless proximity communication range of the personal device; the pairing module receiving a unique input instruction for the personal device; an overlay module converting the input instruction to an augmented reality display input at the personal device; the overlay module applying the augmented reality display at an input interface of the host device to enable a user of the personal device to input the input instruction at the input interface; and the pairing module receiving confirmation of an exclusive pairing between the host device and the personal device.

According to further aspects described herein, a computer program stored on a computer readable medium and loadable into the internal memory of a digital computer is provided, comprising software code portions, when said program is run on a computer, for performing method(s) described herein.

According to further aspects described herein, a method is provided substantially as described with reference to the figures.

According to further aspects described herein, a system is provided substantially as described with reference to the figures.

Described aspects provide benefits, including ensuring secure input by a user for pairing (for instance exclusive pairing) of a personal device with a host device at which the input is made.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A computer-implemented method comprising:
   detecting one or more personal devices in wireless proximity communication range of a host device;
   allocating and storing a respective unique input instruction for each personal device in range, wherein a unique input instruction is convertible to an augmented reality display input at a personal device;
   transmitting the unique input instruction to the personal device;
   providing an input interface of the host device;
   receiving, from a user of the personal device, user input at the input interface of the host device; and
   activating an exclusive pairing between the host device and the personal device for which the user input has been received.

2. The method of claim 1, wherein the host device maintains a respective separate communication channel for each personal device in range.

3. The method of claim 2, wherein maintaining a separate communication channel for the personal device includes carrying out a secure handshake exchanging one or more encryption keys.

4. The method of claim 2, further comprising:
   based on receiving the user input at the input interface, validating the user input by comparing the user input to the stored unique input instruction for the personal device;
   sending a confirmation with the personal device identified in the storage; and
   discarding other separate communication channel connections to other personal devices in range.

5. The method of claim 4, further comprising:
   receiving notification of the end of the exclusive pairing with the personal device; and
   re-establishing the separate communication channel connections with the other personal devices in range.

6. The method of claim 1, further comprising:
   deallocating and updating the storage of a unique input instruction for a personal device that exits the range of the host device.

7. The method of claim 1, further comprising:
   detecting a discovery signal of the personal device in range of the host device, wherein the discovery signal includes an identifier of the personal device;
   referencing the storage of the unique input instruction for the personal device with the identifier of the personal device.

8. The method of claim 1, wherein transmitting the unique input instruction to the personal device includes transmitting a location and guidance to facilitate input of the user input at the input interface of the host device.

9. The method of claim 8, wherein transmitting the location and guidance includes providing a Quick Response code or other marker providing the information.

10. A data processing system comprising:
    a memory; and a processor in communications with the memory, wherein the data processing system is configured to perform a method comprising:
  detecting one or more personal devices in wireless proximity communication range of a host device;
  allocating and storing a respective unique input instruction for each personal device in range, wherein a unique input instruction is convertible to an augmented reality display input at a personal device;
  transmitting the unique input instruction to the personal device;
  providing an input interface of the host device;
  receiving, from a user of the personal device, user input at the input interface of the host device; and
  activating an exclusive pairing between the host device and the personal device for which the user input has been received.

11. The data processing system of claim 10, wherein the host device maintains a respective separate communication channel for each personal device in range, and wherein maintaining a separate communication channel for the personal device includes carrying out a secure handshake exchanging one or more encryption keys.

12. The data processing system of claim 11, wherein the method further comprises:
  based on receiving the user input at the input interface, validating the user input by comparing the user input to the stored unique input instruction for the personal device;
  sending a confirmation with the personal device identified in the storage; and
  discarding other separate communication channel connections to other personal devices in range.

13. The data processing system of claim 12, wherein the method further comprises:
  receiving notification of the end of the exclusive pairing with the personal device; and
  re-establishing the separate communication channel connections with the other personal devices in range.

14. The data processing system of claim 10, wherein the method further comprises:
  deallocating and updating the storage of a unique input instruction for a personal device that exits the range of the host device.

15. The data processing system of claim 10, wherein the method further comprises:
  detecting a discovery signal of the personal device in range of the host device, wherein the discovery signal includes an identifier of the personal device;
  referencing the storage of the unique input instruction for the personal device with the identifier of the personal device.

16. The data processing system of claim 10, wherein transmitting the unique input instruction to the personal device includes transmitting a location and guidance to facilitate input of the user input at the input interface of the host device.

17. A computer program product comprising:
  a computer readable storage medium readable by a processor and storing instructions for execution by the processor for performing a method comprising:
    detecting one or more personal devices in wireless proximity communication range of a host device;
    allocating and storing a respective unique input instruction for each personal device in range, wherein a unique input instruction is convertible to an augmented reality display input at a personal device;
    transmitting the unique input instruction to the personal device;
    providing an input interface of the host device;
    receiving, from a user of the personal device, user input at the input interface of the host device; and
    activating an exclusive pairing between the host device and the personal device for which the user input has been received.

18. The computer program product of claim 17, wherein the host device maintains a respective separate communication channel for each personal device in range, and wherein the method further comprises:
  based on receiving the user input at the input interface, validating the user input by comparing the user input to the stored unique input instruction for the personal device;
  sending a confirmation with the personal device identified in the storage;
  discarding other separate communication channel connections to other personal devices in range.
  receiving notification of the end of the exclusive pairing with the personal device; and
  re-establishing the separate communication channel connections with the other personal devices in range.

19. The computer program product of claim 18, wherein maintaining a separate communication channel for the personal device includes carrying out a secure handshake exchanging one or more encryption keys.

20. The computer program product of claim 17, wherein the method further comprises:
  deallocating and updating the storage of a unique input instruction for a personal device that exits the range of the host device.

* * * * *